United States Patent
Solntseva et al.

(10) Patent No.: US 9,519,641 B2
(45) Date of Patent: Dec. 13, 2016

(54) PHOTOGRAPHY RECOGNITION TRANSLATION

(71) Applicant: ABBYY Software Ltd., Nicosia (CY)

(72) Inventors: Ekaterina Solntseva, Moscow (RU); Konstantin Tarachyov, Moscow (RU)

(73) Assignee: ABBYY Development LLC (RU)

( * ) Notice: Subject to any disclaimer, the term of this patent is extended or adjusted under 35 U.S.C. 154(b) by 267 days.

(21) Appl. No.: 13/651,866

(22) Filed: Oct. 15, 2012

(65) Prior Publication Data

US 2014/0081619 A1    Mar. 20, 2014

Related U.S. Application Data

(63) Continuation-in-part of application No. 13/694,900, filed on Sep. 18, 2012.

(51) Int. Cl.
*G06F 17/28* (2006.01)
*G06F 17/30* (2006.01)

(52) U.S. Cl.
CPC ....... *G06F 17/289* (2013.01); *G06F 17/30247* (2013.01); *G06K 2209/01* (2013.01)

(58) Field of Classification Search
CPC . G01L 19/0212; G01L 19/005; G01L 19/0017
USPC .......................................... 704/2–7
See application file for complete search history.

(56) References Cited

U.S. PATENT DOCUMENTS

| | | | |
|---|---|---|---|
| 5,175,684 A * | 12/1992 | Chong | 704/3 |
| 5,608,622 A * | 3/1997 | Church | 704/3 |
| 6,047,251 A * | 4/2000 | Pon et al. | 704/1 |
| 6,049,328 A | 4/2000 | Vanderheiden | |
| 6,115,482 A * | 9/2000 | Sears et al. | 382/114 |
| 6,539,116 B2 * | 3/2003 | Takaoka | G06K 9/00 382/176 |
| 6,937,974 B1 * | 8/2005 | d'Agostini | 704/2 |
| 7,254,531 B2 * | 8/2007 | Nir | G10L 13/00 382/313 |
| 7,499,588 B2 * | 3/2009 | Jacobs et al. | 382/182 |
| 7,505,627 B2 * | 3/2009 | Chang et al. | 382/181 |
| 7,716,037 B2 * | 5/2010 | Precoda et al. | 704/2 |
| 7,912,289 B2 * | 3/2011 | Kansal et al. | 382/181 |
| 7,917,286 B2 * | 3/2011 | Taylor et al. | 701/468 |
| 7,974,832 B2 * | 7/2011 | Furuuchi et al. | 704/7 |
| 8,214,768 B2 * | 7/2012 | Boule et al. | 715/863 |
| 8,218,020 B2 * | 7/2012 | Tenchio | G06F 17/30017 348/211.3 |
| 8,239,183 B2 * | 8/2012 | Sembower | 704/2 |
| 8,312,032 B2 * | 11/2012 | Choi et al. | 707/758 |
| 8,315,850 B2 * | 11/2012 | Furuuchi et al. | 704/7 |
| 8,364,464 B2 * | 1/2013 | Elgazzar et al. | 704/2 |
| 8,373,724 B2 * | 2/2013 | Ratnakar et al. | 345/619 |

(Continued)

*Primary Examiner* — Matthew Baker
(74) *Attorney, Agent, or Firm* — Veronia Weinstein

(57) ABSTRACT

Methods are described for efficient and substantially instant recognition and translation of text in photographs. A user is able to select an area of interest for subsequent processing. Optical character recognition (OCR) may be performed on the wider area than that selected for determining the subject domain of the text. Translation to one or more target languages is performed. Manual corrections may be made at various stages of processing. Variations of translation are presented and made available for substitution of a word or expression in the target language. Translated text is made available for further uses or for immediate access.

36 Claims, 6 Drawing Sheets

(56) References Cited

U.S. PATENT DOCUMENTS

| | | | |
|---|---|---|---|
| 8,380,487 B2* | 2/2013 | Bastide | G06F 17/289 382/182 |
| 8,471,824 B2* | 6/2013 | Kim et al. | 345/173 |
| 8,515,185 B2* | 8/2013 | Lee | G06K 9/036 382/190 |
| 8,626,512 B2* | 1/2014 | Kurzweil et al. | 704/270 |
| 8,862,456 B2 | 10/2014 | Krack et al. | |
| 8,954,314 B2 | 2/2015 | Powalowski | |
| 8,965,126 B2* | 2/2015 | Yamazoe et al. | 382/177 |
| 2001/0032070 A1* | 10/2001 | Teicher | G06F 17/28 704/2 |
| 2002/0194300 A1* | 12/2002 | Lin | G06F 17/289 709/217 |
| 2003/0200078 A1* | 10/2003 | Luo et al. | 704/2 |
| 2004/0102956 A1* | 5/2004 | Levin | 704/2 |
| 2004/0138872 A1* | 7/2004 | Nir | 704/10 |
| 2005/0021322 A1* | 1/2005 | Richardson | G06F 17/2836 704/2 |
| 2005/0197825 A1* | 9/2005 | Hagerman et al. | 704/2 |
| 2005/0267734 A1* | 12/2005 | Masuyama | 704/2 |
| 2006/0047704 A1* | 3/2006 | Gopalakrishnan | 707/104.1 |
| 2006/0083431 A1* | 4/2006 | Bliss | G06F 17/289 382/229 |
| 2006/0173829 A1* | 8/2006 | Neeman | 707/3 |
| 2006/0245005 A1* | 11/2006 | Hall et al. | 358/448 |
| 2006/0253491 A1* | 11/2006 | Gokturk et al. | 707/104.1 |
| 2008/0233980 A1 | 9/2008 | Englund et al. | |
| 2009/0220175 A1* | 9/2009 | Tzadok et al. | 382/317 |
| 2010/0008582 A1* | 1/2010 | Kim et al. | 382/177 |
| 2010/0030549 A1* | 2/2010 | Lee | G06F 1/1626 704/4 |
| 2010/0204979 A1* | 8/2010 | Chiu et al. | 704/2 |
| 2011/0010162 A1* | 1/2011 | Elgazzar et al. | 704/2 |
| 2011/0066421 A1* | 3/2011 | Lee | G06F 17/289 704/2 |
| 2011/0167350 A1* | 7/2011 | Hoellwarth | 715/727 |
| 2011/0313754 A1* | 12/2011 | Bastide et al. | 704/2 |
| 2012/0010870 A1* | 1/2012 | Selegey et al. | 704/3 |
| 2012/0068937 A1* | 3/2012 | Backlund et al. | 345/173 |
| 2012/0109632 A1 | 5/2012 | Sugiura et al. | |
| 2012/0245922 A1* | 9/2012 | Kozlova et al. | 704/3 |
| 2013/0004068 A1* | 1/2013 | Koo | G06F 17/289 382/165 |
| 2013/0103383 A1* | 4/2013 | Du et al. | 704/3 |
| 2013/0108115 A1* | 5/2013 | Hwang et al. | 382/106 |
| 2013/0231914 A1* | 9/2013 | Powalowski | 704/3 |
| 2013/0285930 A1* | 10/2013 | Thorsander et al. | 345/173 |
| 2014/0081619 A1* | 3/2014 | Solntseva | G06F 17/289 704/3 |
| 2014/0180670 A1* | 6/2014 | Osipova | 704/3 |
| 2014/0215329 A1* | 7/2014 | Zilberman et al. | 715/702 |
| 2014/0222413 A1* | 8/2014 | Rossmann | 704/3 |
| 2014/0297256 A1* | 10/2014 | Rogowski et al. | 704/2 |

* cited by examiner

PHOTOGRAPHY RECOGNITION TRANSLATION

CROSS-REFERENCE TO RELATED APPLICATIONS

For purposes of the USPTO extra-statutory requirements, the present application constitutes a continuation-in-part of U.S. patent application Ser. No. 13/694,900 filed on 18 Sep. 2012 and initially titled "Swiping Action for Displaying a Translation of a Textual Image," which is currently co-pending, or is an application of which a currently co-pending application is entitled to the benefit of the filing date. Such application or applications are Related Applications. All subject matter of the Related Applications and of any and all parent, grandparent, great-grandparent, etc. applications of the Related Applications is incorporated herein by reference to the extent such subject matter is not inconsistent herewith.

FIELD

Embodiments of the present invention generally relate to the field involving the processing of a photographic image through optical character recognition (OCR) and performing automated translation.

BACKGROUND

Many people face the challenge of translating text in a foreign language in newspapers, magazines and elsewhere because of, for example, absence of the requisite vocabulary, weak knowledge of the foreign language and so on.

Generally, optical character recognition (OCR) and automated translation require a lot of the computational resources of electronic devices. So, usually these technologies are limited to use in relatively high-performance computers (e.g., desktops, laptop computers) and servers, and these technologies are not readily available in portable devices and in all types of locations in everyday life: in the subway, in the car, in the journey to work, at a sporting event and so on.

There is a plethora of portable electronic devices with display screens capable of displaying text and a camera allowing these devices to capture and display a photographic image on their screen. Devices with a touch screen include many mobile devices, such as laptops, tablet computers, smartphones, mobile phones, personal digital assistants (PDAs), etc. The disclosed methods allow mobile or portable electronic devices to perform or access OCR functions and then to translate recognized text for use by these devices.

Modern, portable electronic devices have enough computer resources for supporting the use of electronic dictionaries, which may be installed locally or may be accessed on a network-accessible server. OCR systems and machine translation systems also may be available over networks, standards and protocols such as the Internet, WiFi, Zigbee, Bluetooth, etc. However, the information in these dictionaries has been locked up and not adequately integrated with other technologies. Meaningful, accurate and easily-obtained translation has remained elusive.

SUMMARY

The disclosed methods allow a device to receive or generate a translation of any type of text from any image-based source. In one embodiment, the invention provides methods that generally include receiving, by an electronic device, a photographic image with text to be translated, recognizing text in this photographic image with an OCR system or technology, translating the recognized text and displaying the result of translation on the screen of electronic device. A user is provided with a means and an opportunity to manually correct results at each step.

Using a mobile device's camera is preferable for capturing or receiving a photographic image. In one embodiment, the photographic image may be accessed from a memory or a storage component. Other aspects of the invention are described in the detailed description.

DETAILED DESCRIPTION

Figure 1A:
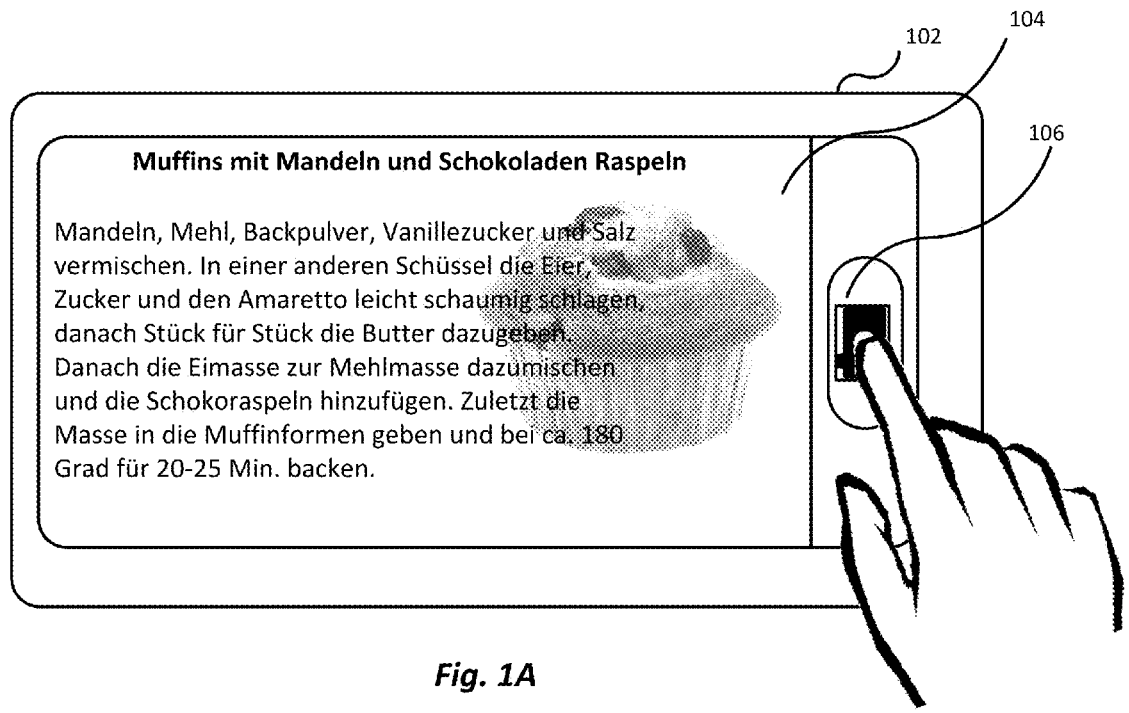
FIG. 1A shows an example of an electronic device displaying a graphical user interface displaying German text to be translated.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Advantageously, the present invention discloses an electronic device that allows a user to perform a recognition and translation of a photograph that includes text or text-based information. The image may be received from a camera included with the electronic device. The method includes displaying a translation of text from the image on a screen of the electronic device. Manual corrections may be done at each step of the disclosed methods.

Generally, for purposes of recognizing text in a photographic image, a user's electronic device may include optical character recognition (OCR) algorithms, technology or functionality. OCR functionality may be installed locally in the electronic device or may be operated and made available at one or more accessible servers and it may be accessible via a network, or some standard or protocol such as the through the Internet, WiFi, Zigbee or, Bluetooth technology.

OCR systems are used to transform images or representations of paper documents (photos) into computer-readable and computer-editable and searchable electronic files. A typical OCR system includes an imaging device or component that produces the image for document and software that processes the images. As a rule, this software includes an OCR program or set of algorithms that can recognize symbols, letters, characters, digits, and other units and save them into a computer-editable format—an encoded format.

An electronic device may also include or have access to a set of dictionaries, and may be able to access or connect to a machine translation system, set of algorithms or component. The machine translation system may be located on a remote server, access to which is available via a network connection.

Electronic dictionaries may include a software program and dictionary data. The software program may include a shell, which provides a graphical user interface, morphology models to display inflected forms, context search that uses an index, a teaching module, etc. Dictionaries that the user needs may be independently stored in different locations including on the local device or electronic device or a server accessible over a local area network (LAN) or a wide area network (WAN) such as the Internet.

Referring to FIG. 1A, an electronic device 102 comprises a display screen 104 and camera button (real or virtual) 106 for capturing an image with text. The content presented on the screen 104 may be captured or presented by a camera application; some or all of an image is shown on the display screen 104.

The electronic device 102 may comprise a general purpose computer embodied in different configurations such as a mobile phone, smartphone, cell phone, digital camera, tablet computer, laptop computer or any other gadget or combination of devices including those that have a screen and/or camera. A camera allows capture and conversion of information to a digital form. The information may be in paper form (e.g., magazine, book, newspaper), or on a screen of another device.

Figure 1B:
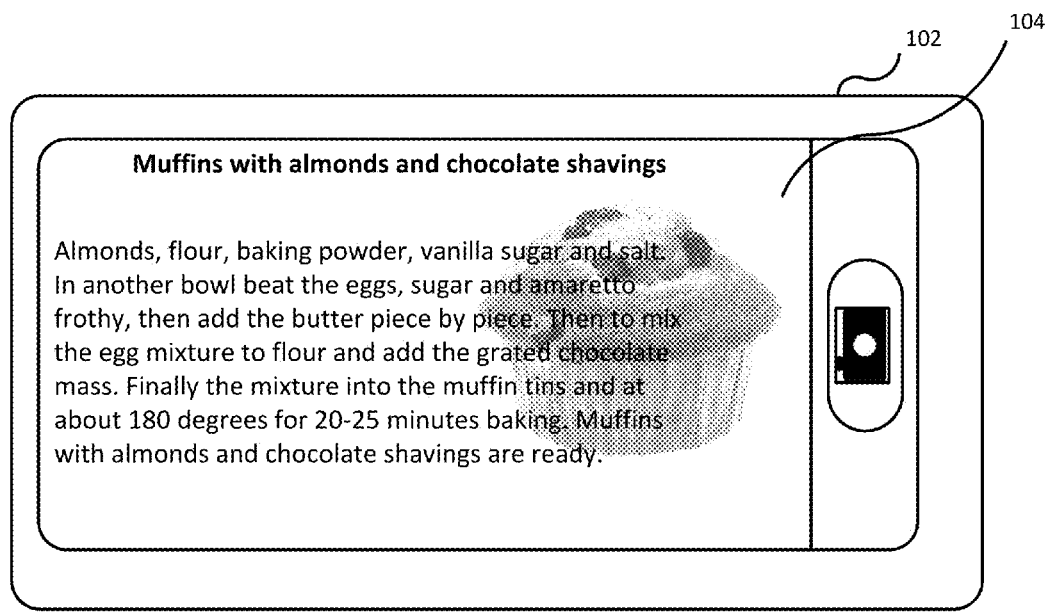
FIG. 1B shows an example of the electronic device of FIG. 1A with a result of performing a method as described herein showing an accurate English translation of the German text.

Referring now to FIG. 1B, the electronic device 102 displays a result through a graphical user interface or display screen 104 of performing a recognition and accurate English translation of the German text.

Figure 2:
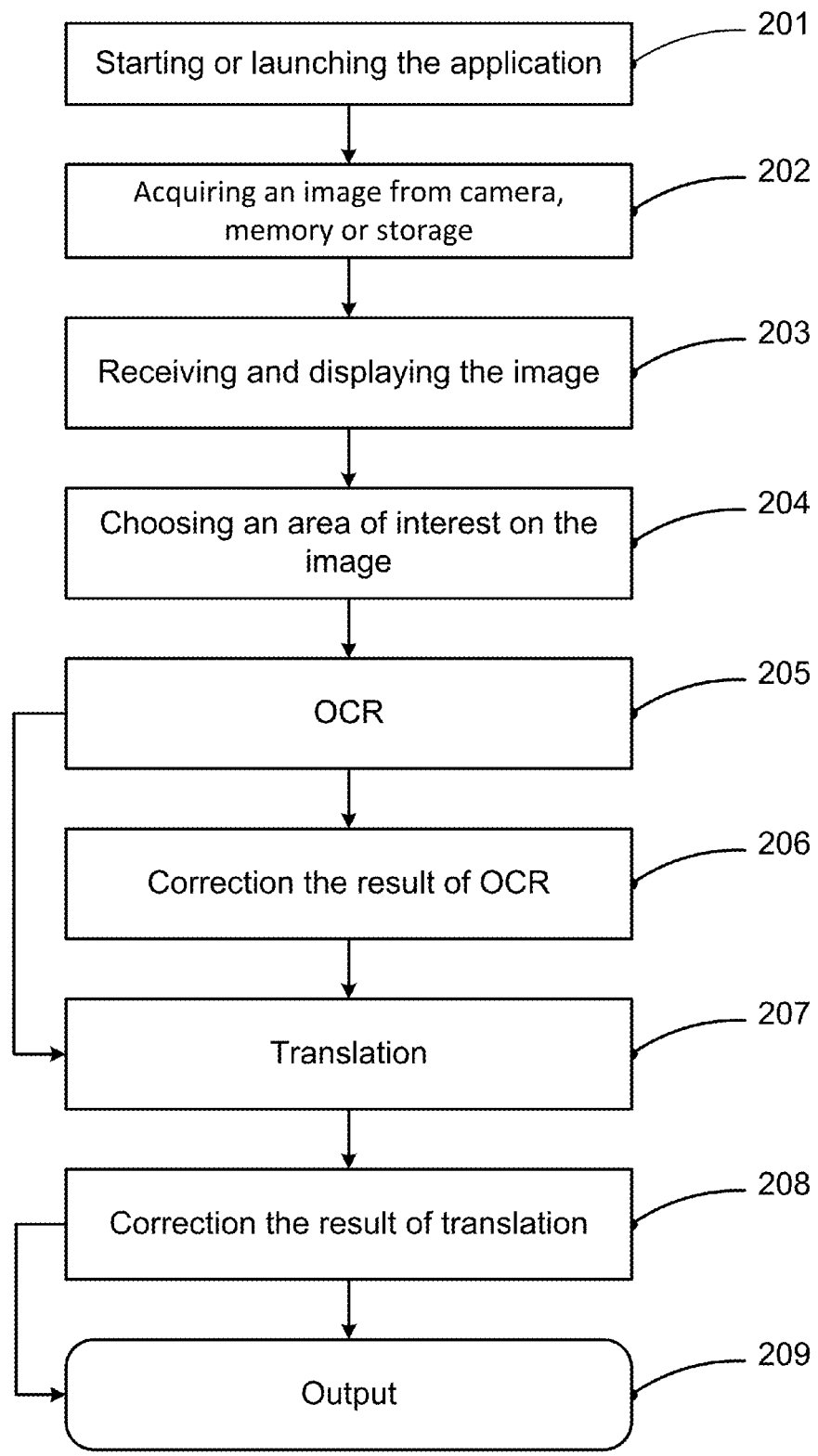
FIG. 2 shows a flowchart of operations in accordance with an embodiment of the present disclosure.

Referring now to FIG. 2, there is shown a method or flowchart of operations performed by logic or one or more software algorithms or applications, in accordance with one embodiment of the invention. The method includes starting or launching an application 201. The application may be operated on a hand-held electronic device, or some other device.

Next, an image may be acquired 202. The image should include text to be translated. In one embodiment, a system user may choose a photographic image with text to be translated from a memory or storage element of an electronic device.

Next, the process includes displaying some or all of the image 203 such as on a screen 104 of an electronic device 102.

If a system user is not interested in the whole image for subsequent image processing, an area of interest may be selected by a user at step 204. In one embodiment, selecting a portion or fragment of the image may be performed by using—for example—a gesture to point at or indicate an area of the image or display. Alternatively, a motion or gesture indicating a figure or directing a cursor on the screen may be used.

Selection of any desired fragment of the text for the following translation may be implemented in one of several different manners, for example by performing a swiping gesture diagonally over a rectangular area of interest, by performing a circular motion over an area of interest and then having the software determine the boundaries of the text elements that were touched by the circular motion, by performing a selection by swiping upwards or downwards to make a selection of several character strings (.e.g., lines of text, sentences), or by performing a selection word-by-word such as by performing a swiping gesture on the text with a finger without interruption on a touch-sensitive screen. Selection of a plurality of words or regions that include one or more words may be done by sequentially touching a touch-sensitive display over a yet-unrecognized image (text in a raw or bitmapped form). When making some gestures, a circumscribing rectangle may be formed and indicates or forms a selection of a rectangular area in the image—one that crops or designates an area of interest. Successive gestures may be captured and stored for later use. Successive gestures facilitate or cause several areas of interest to be indicated prior to segmenting, recognizing and/or translating of text (e.g., characters, words, sentences).

Moreover, in an alternative embodiment, the described invention performs recognition (OCR) not only of a selected text or user-identified portion of the text to be translated but of the entire text image. For this, the OCR algorithm (or related algorithm) identifies an area wider than an area initially designated or selected by a user. Recognizing text and translating text outside of a selected area are useful for identifying the subject domain of the text for any subsequent translation of a particular selected portion of text. For example, if a user selects just two words from a paragraph for translation, a subject domain may be found from the paragraph in the original language. Alternatively, a subject domain may be found from a language independent semantic structure of a selection, of a sentence that includes a selection, or from a set of sentences (e.g., paragraph) that includes a selection. Thus, a subject domain may be identified precisely only on the basis of a text that is large enough. For example, if user selects in the text only two words to be translated, it is not easy for a system to determine a corresponding subject domain. Especially, it is especially difficult when the identified words each has several possible meanings. Subsequently, these words will be found to have several variants of translation (in a target language). To avoid ambiguity in the meaning of selected words, the system identifies the subject area (e.g., medicine, computer science, history, art and so one) based on the context of some or the entire text found in the image (e.g., sentence in which the words appear, paragraph in which the words appear, page on which the words appear, section of a document in which the words appear, images that appear behind (underneath) or near the text of which the words are part). Alternatively, the context or subject domain may be found from images that were taken at about the same time by the device, and which have a possible relationship or association with the image in question. For example, if a user takes several pictures of a page of a menu, processing matches the various pictures to the same context (i.e., the menu) and OCR processing can recognize words and provide them for further analysis and for yielding of a more meaningful context to words that are selected or indicated for translation to a target language.

Knowing the context or subject domain allows a subsequent process step to reduce a number of translation variants or to reduce an amount of computation resources when, for example, presenting likely variants of translation for substitution in a translation in a target language. Other uses and other benefits of knowing the context or subject domain are possible including, for example, determining a boundary where a segmenting process may find text relevant to a detected gesture over a text portion of an image.

At least two different scenarios are available for a user according to implementations of the invention. A first one is determining whether a translation depends on the context of the text image. For this scenario, extending of an area of selection is desired or required.

The second scenario is translation without context, for example based on the frequency of usage in the language or based on data about a previous history of translation and corrections made to the results of several translations.

Also, an automatic determination mode of translation is also available. For example, when selected by a user, a portion of a text image that is represented by multi-column text (e.g., text captured from magazines and newspapers), the system checks the subject domain of each column and identifies whether a user needs the context of all the text of all of the columns found in the image or not. So, if the text in the surrounding area (columns) of a selected portion of the text has different themes, there may be no need to translate all these surrounding text areas (columns). And if the system determines that the topic for all columns is the same, a translation is performed for the entire text image, or for a corresponding set of areas or columns.

Advantageously, recognition of an extended area allows the processing to identify a subject domain of the text on the basis of some recognized page elements such as pictures within a captured image. An extended area may be selected or identified by a user. For example, if the extended area includes a portrait of the physicist A. Einstein or pictures of electric circuits, subsequently, the system may suggest that most probably the text is about physics. So, a translation of recognized text can be performed within the identified subject domain of physics.

With reference again to FIG. 2, at step 205, OCR software or functionality is applied to a region with text. The image may be sent to a server where an OCR system is operational. The result of OCR processing is a word or word combination represented by a string of characters. As part of OCR (step 205), morphology dictionaries may also be used, as higher OCR accuracy and improved error correction are often achieved by comparing the recognition results with similar word forms in one or more morphology dictionaries. The morphology dictionaries may be used in conjunction with the OCR and translation functions.

The language of recognition may be preliminarily set by a user or automatically detected. One of the ways of automatical detection is forming a determination based on available geolocation data. For example, if a user is located in France, the system identifies French as the first possible language for recognition.

Determination of the language of the text in an image to be recognized may be determined in devices equipped with navigation functionality such as GPS, GLONASS, GSM, GDMA and other analogical modules, Wi-Fi adapters and so on. Data from navigation technologies of electronic devices with the help of geocoding services may be used for detecting the region or country where the user (electronic device) is located.

Figure 5:
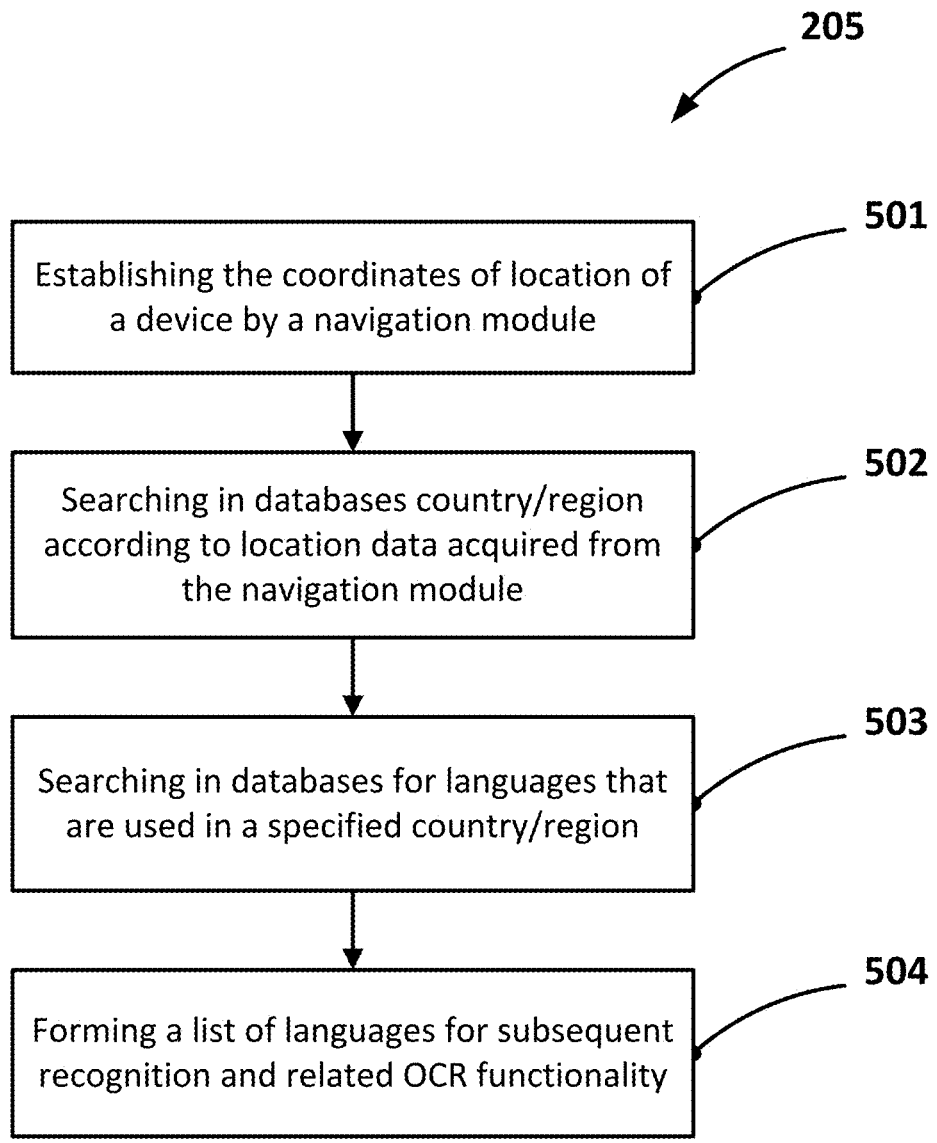
FIG. 5 shows a flowchart of operations in accordance with determination language of the textual image for recognition.

Referring to FIG. 5, there is shown a method or flowchart of operations performed by logic or one or more software algorithms or applications, in accordance with a determination of the language of text to be recognized based on geolocation data. The language to be determined is for use in the processes related to recognition. The method includes establishing the coordinates of location of a device by a navigation module (e.g., logic, application, instructions) at step 501. The navigation module also encompasses logic for requesting and receiving location data from another device such as a network server that tracks the location of a mobile device that is performing translation.

Next, at step 502, the correspondence between coordinates acquired from navigation module of a device and any certain country/region is established with help of appropriate correspondence tables or databases. That is, the system searches for the country or region in correspondence with the acquired coordinates from the navigation module of the device.

The country/region detected at the previous step 502 are used for searching in other databases or correspondence tables at step 503 to determine a list of languages that are used or preferred in the particular country or region corresponding to the current location of the device performing the recognition.

Finally, at step 504, the defined languages are added to the list of languages for use by the recognition and other OCR functionalities. In this way, a list of languages is proposed by the system based on geolocation data. In one embodiment, languages in the list of this type may be arranged according to how widely each language is used in the identified region or country. For example, the most widely used language should take first place in the list and should be suggested as the most probable language for recognition. For example, suppose that the navigation system determines that the geolocation of the electronic device (user) is Belgium (Kingdom of Belgium). According to a correspondence table there are three official languages in Belgium: French, Dutch and German. Also, there are regional languages: West Flemish, East Flemish, Brabantian, Limburgish, Walloon, Picard, Champenois, Lorrain, and Low Dietsch. But the most spoken language is Dutch. So, in the described list of languages for recognition, Dutch would take the first place as the most common used language in Belgium. Any variety of data, metrics and preferences may be combined with the geolocation data to sort and arrange a list of languages to be used for recognition. One example of such other data may be a set of historical geolocation data. For example, if a traveler is fond of traveling to and staying in French speaking regions or countries (prior to entering Belgium), the list of languages for the particular device (and user) may be rearranged so that French appears as the first or preferred language for recognition.

Returning back to the flowchart of FIG. 2, mistakes in recognized text are inadmissible or at least undesirable for a subsequent translation. That is, mistakes in recognition cause catastrophic failures of translation. Therefore, extremely accurate recognition is highly desired and needed. So, at step 206 if the user is not satisfied with the result of recognition (OCR), manual corrections may be performed. If a user is not satisfied with a translation from a particular recognized text, a user can return to the results of recognition, can make a correction to the recognized text, and then can re-initiate translation based on the correction. A user effectively has a veto power over the output of recognition. Optionally, certain corrections may not be performed depending on, for example, whether the errors are present in the original text selected for translation, or in an area outside of a selection.

In one embodiment, the system may suggest other appropriate variants for the recognized text such as variants that reflect a more correct spelling, grammar, syntax, etc. by touching on the recognized word or expression with the mistake. In another embodiment, the system user may correct mistakes by manually entering a correct variant from the keyboard.

At step 207, translation of recognized and revised text is performed. The source language also may be determined by geolocation data. If the user is located in France, the system identifies, based on data acquired from a navigation system, French as the first possible source language. The steps of identifying a source language are similar to the steps or algorithm of identifying a language for recognition. Or the source language may be manually specified by user. The output language of translation may be preliminarily selected before translation occurs. For example, a default target language may be set internally as a configuration setting for a software application so that OCR and translation can occur effectively as part of a single operation without pausing for further input, correction or selection. The single type of operation includes (1) capturing a photograph, and (2) generating a quality translation of a portion of text in the photograph.

Generally, a mode of translation may be preliminary selected in a customized menu. Customizing may be done based or depending on a kind of text. In one embodiment two modes of translation are available for a user: a word-by-word dictionary translation or a machine translation. Other modes of translation also may be available.

In a word-by-word dictionary translation, the dictionary or set of dictionaries may be preliminarily selected by a user or may be programmatically or automatically made available. Dictionary software may use by default one or more dictionaries or a user may specify one or more desired dictionaries. A default dictionary on a given subject may be selected if the dictionary software determines that the text belongs to a specialized subject (e.g., medicine, law, automobiles, computers).

Additionally, the electronic dictionary includes a morphology module, so that the query word or word combination need not be in a base form, or "dictionary" form—the morphology module identifies the base form of an inflected form. If more than one base form is possible, the morphology module identifies possible alternatives. Also, in some cases, the morphology module may determine a grammatical form of the source word, for example, a number for nouns or form of verbs, to select a proper form for the translation in an output language.

The translation may be performed in the electronic device or may be sent to a special server operating a translation system. For example, apart from machine and word-by-word dictionary translation, translation may be performed by a professional interpreter.

If a user selects only a portion of the text in the image, the translation of the entire text may be performed. It can be performed due to a function of extending the area selected by a user. The extended area may then be subjected to OCR. The extended area may be recognized and translated. The aim is to determine the context of the unabridged text image and to display a best available translation according to the identified subject domain. By the way, in a preferred implementation, a user only receives on the interface or screen of the electronic device the translation of only the selected portion of the text from the image. At step 207, the result of translation is displayed on a screen 104 of an electronic device 102.

Figure 3:
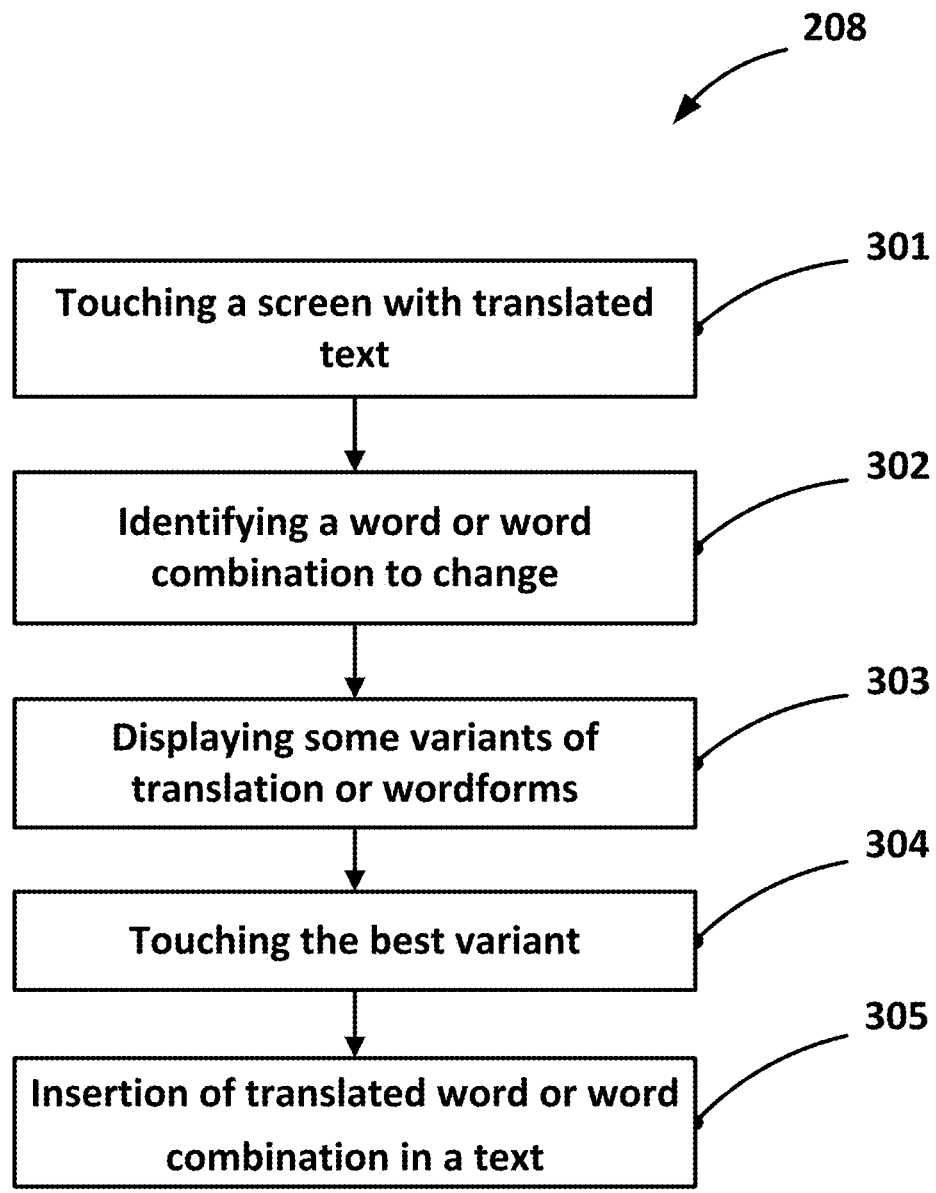
FIG. 3 shows a flowchart of operations in accordance with an embodiment of the present disclosure concerning correction of a translated text.

If a user is not satisfied with the result of translation, such as a translation proposed by a machine or dictionary translation system, a word-by-word correction of the translated text may be performed at step 208 with the help of dictionaries. FIG. 3 demonstrates the flowchart of this process.

The results of corrections of translation are stored in the history of the system for improving the results of subsequent translations. First, the stored history about revisions and corrections is likely highly useful for determining the subject domain of translation for a certain user as this user is likely to translate texts from a small set of subject domains in the future. For example, if a user translates mostly technical texts in the field of computer science, the subject domain of computer science will be determined automatically for subsequent translations. In this way, training of the system is performed.

In another embodiment the topic (subject domain) of translation may depend on the content stored on the mobile device. The term "content" may refer to the email messages, browser history, social media or something else.

In another alternative embodiment, the subject domain may be identified based on data related to or associated with geolocation. The function of geolocation may be optionally preliminarily activated in the settings of the system. Geolocation means the identification of any object such as a mobile device or an Internet-connected computer. For example if the system detects that the user is located in a museum or gallery, the system identifies automatically that the translation of the grabbed text most probably is related to history, art or some domain relevant to the location. Or, if a user is located in or near a restaurant or cafe, the most probable subject area of translation is cooking.

One end of processing 209 includes generating or outputting a translation of identified text on the screen of an electronic device. Alternatively, the translated text may be put over the same background as the source text. For this processing scenario, the letters of the original text may be canceled or removed from their background, and the place of their location may be painted with portions or color of the surrounding background. After that, the translated text is put on the newly updated or generated background. Or, in the alternative, the translated text may be displayed without some or all of the original background.

Referring now to FIG. 3, there is shown a flowchart of operations performed by an application programmed to implement a word-by-word adjustment (208) of a translated text.

When the user wishes to correct a translation or to look up other variants of translation of a desired word or word combination, the user simply points to the word or word combination or touches the corresponding region on the display screen 104 with a finger, a stylus or any other suitable object. The touch 301 initiates a process that enables the user to see an abridged dictionary entry with other variants of translation for the source word or word combination.

Next, the electronic device 102 takes advantage of the touch screen's ability to establish the coordinates of a touch and matches these coordinates against the image on the screen. In one embodiment, when the touch screen senses the touching of the screen 104, e.g. by finger, touch coordinate information corresponding to the touching is conveyed to the software application via the operating system. The coordinates can be used to location a portion of text to change or to recognize (if needed) where recognition implies subjecting a portion of an image to OCR algorithms. The coordinates can be used to identify a word or word combination to change 302 by offering alternatives of translation for selection by a user.

In the scenario of recognition, the OCR algorithms may use text that is located an extended distance from the identified coordinates to assist in accurately recognizing the characters, words and expressions near the detected coordinates. For example, grammar, word form, parts of speech, etc. may be used to more positively recognize one or more characters of text. Techniques which can determine coordinates corresponding to the touching may be very different depending on the type of the touch screen which may be resistive, matrix, capacitive, based on surface acoustic waves, infrared, optical imaging, based on dispersive signal technology or acoustic pulse recognition etc. In another embodiment the touch screen may have a program interface, and the software application may receive coordinates corresponding to the touching directly from the touch screen through the program interface. After the indicated text is recognized, a translation of the indicated text may be generated and displayed such as through a GUI or GUI function or element.

Returning to FIG. 3, at step 303, by touching on a desired translated word or word combination, several other variants of translation of the source word or word combination are displayed on the screen 104 of the electronic device 102. Variants of translation may be displayed in a dropdown list, in a balloon, in a pop-up window, as a set of subscripts, or in any other suitable manner such as at a respective terminus of a spoke emanating from a hub that is consistent with the detected coordinates For example, if the word to change is "buy," variants such as "purchase," "pay for" and "lease" may appear at the respective ends of three spokes that are spread at intervals of 120 degrees from a central point or hub. A swiping motion toward one spoke or a second tap at or near one of the variants selects the respective variant, and the word "buy" is replaced with the variant.

At step 304 the most appropriate variant of translation may be chosen by touching it. Manual input of an appropriate or desired variant may be performed by a user where a desired variant is absent from the list of proposed variants.

Next, at step 305, a desired variant of translation is inserted in the translated text by the translation system.

Another scenario is illustrated in FIG. 1A. With reference to FIG. 1A, a system user wants to translate the menu from the German language into the English language. After receiving the image of a menu on the screen (104) of an electronic device 102, for example as a photo from mobile camera, OCR and machine or dictionary translation may be performed. Generally, the text of a menu is presented as a set of words that grammatically do not agree, so it is reasonable to translate the menu with a word-by-word dictionary translation technique. First of all, word-by-word dictionary translation technique requires considerably fewer resources and less time in comparison with machine translation, and it may be performed without an Internet connection.

As shown in FIG. 1B the result of translation of a photographed textual image is displayed on the screen (104) of the electronic device 102.

Figure 4A:
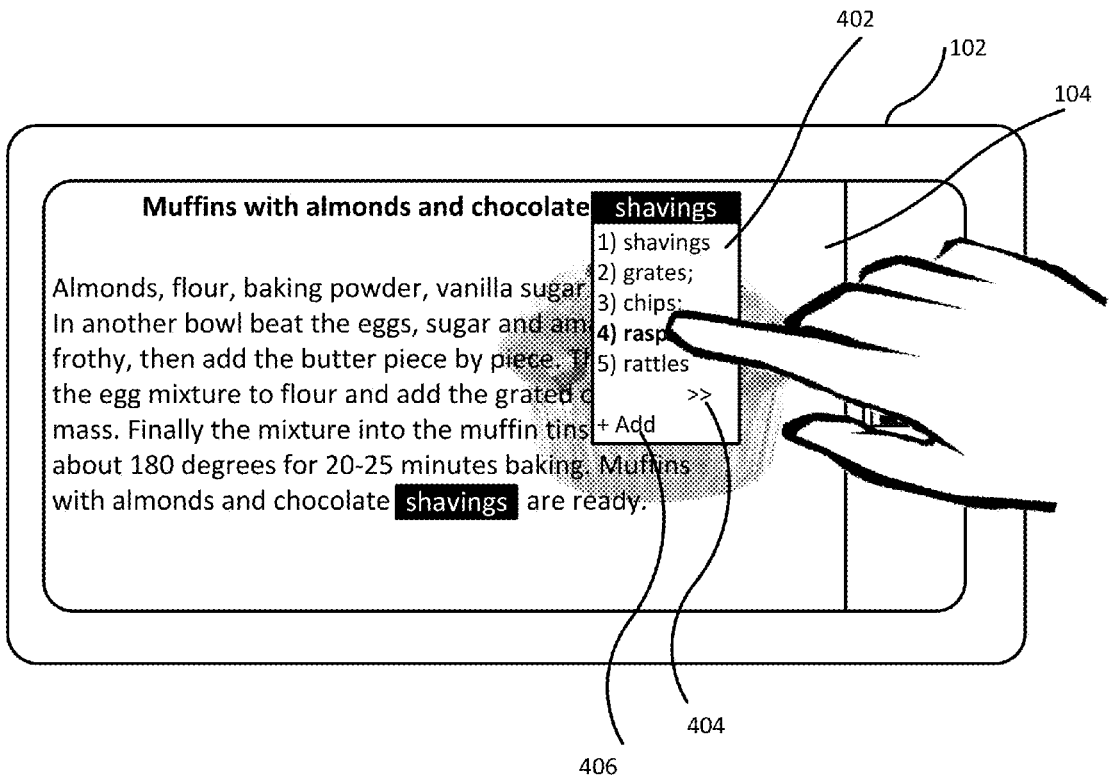
FIG. 4A shows an example of a graphical user interface or touch-sensitive display where the GUI facilitates selection by a user of a desired word, and showing possible variants of translation of the selected word in an output language.
Figure 4B:
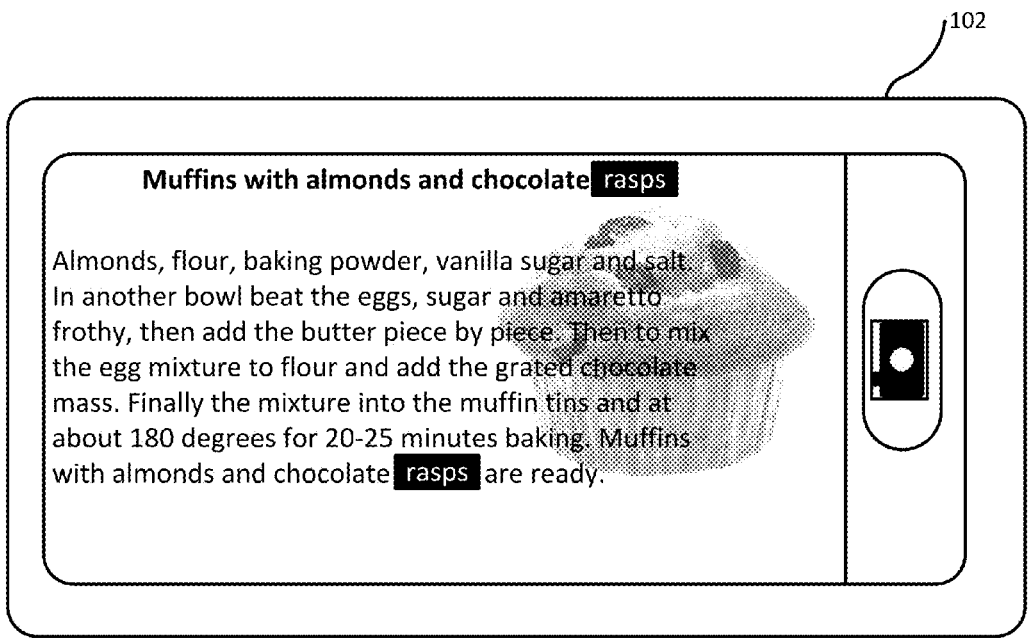
FIG. 4B shows an example of a result of correcting a translated text by inserting a more appropriate variant of translation.

As shown in FIG. 1B and FIG. 4B, the translated text is put over a source background that has been modified by preliminarily removing from it the original text.

In some cases, translation is carried out improperly or it is more useful to leave the word or the word combination without translation because during translation it can lose its original sense, or that the word in the source language has been adopted in the target language. Moreover a word or word combination can have several meanings and therefore the word or word combination may have several variants of translation in the target language. Therefore, instead of generating and directly displaying a translation, a program, set of algorithms or logic is provided to give a user a choice of variants of translation from a subject domain corresponding to a context associated with the source text. So, to avoid the above-listed shortcomings, the disclosed invention allows a user—through a graphical user interface (GUI)—to make corrections in a translated text as a translation is generated or rendered to the display of the electronic device. Thus, a user is presented with a sequence of choices for a translation of a sequence of words or expressions.

If the user is not satisfied with the quality of the machine or dictionary translation, a system user can manually make adjustments to the translated text. For example, as shown in FIG. 4A, a system provides a word-by-word dictionary translation and offers a translation of a German noun. In the example shown, the plural "raspeln" in the English language is translated as the noun "shavings". Supposing for a moment that the translation "shavings" is not appropriate in a context of a recipe. Now suppose that the best translation for the word "raspeln" is something other than "shavings." It is desirable to replace any translation offered by a translation system for another variant of translation from the cooking subject domain. In order to make a change to the word "shavings," a system user touches the desired word "shavings" on a screen. Subsequently, a drop-down list (402) appears with available variants of translation for the original noun "raspeln": shavings; grates; chips; rasps; rattles. One can choose by touching the most suitable translation for this context from the proposed variants. If there is no suitable variant among the shown variants of translation, one can get (404) the complete list of translation variants of this word, if initially not all variants are offered.

The most appropriate variant of translation in the example shown in FIG. 4A is the noun "rasps". So, by touching on this word, a system user can insert a variant in the translated text instead of the word or expression initially proposed by the translation system.

In the disclosed invention, during correction of a translated text, a system user can manually input an appropriate variant of translation in a case where there are no suitable variants in the list proposed by dictionary. In one implementation this option may be performed by touching the button "add" (406), manually entering a variant of translation and following steps that end in inserting of the newly-entered variant into the translated text.

In one implementation, the list of variants displayed not only include direct variants of translation of a word, but also shows various wordforms of the word to be translated, e.g. tense forms of verbs, a noun in plural form, etc.

In our example the word "raspeln" is used in a plural sense in the text. That is why by touching on "raspeln," a dropdown list with the following variants of translation from the source German language into output English language are proposed: shavings, grates, chips, rasps, and rattles.

For a word being translated or any variant of translation, a reference/calling of an entry with a detailed translation of the word or variant is provided. Examples of use, view of a translation from dictionaries of various subjects (e.g. Universal, Computer, Economics, Science, etc.) are made available by making a subsequent selection. For example, a detailed translation may be called by performing a double touch gesture on the interesting word. Another manner of opening an entry with a detailed translation may be implemented to trigger the functionality described herein.

Moreover by touching or selecting any word to be corrected, all other variants of its usage in the whole translated text are highlighted. So, as shown in FIG. 4A, by touch on the word "shavings" in the fifth menu item, the noun "shavings" in the sentence "Ice with coconut shavings" is automatically highlighted.

Also, one implementation of translation includes providing a preliminarily specified option for changing all instances of a translated word with a subsequent manual correction. By manually correcting any word in a target language or target text, automatic correction of other found variants according to their respective usages in the text is performed. In the above disclosed example, the global replacement in the text of the noun "shavings" is performed; one of the appropriate variants of translation "rasps" is inserted in each place where "shavings" appeared. Two instances of "rasps" are highlighted in the translated text shown in FIG. 4B.

The following method is especially useful for acquiring a quick translation of any text made available as text in an image. After receiving or gaining access to a particular photographic image, recognition is performed directly in response to a user selecting an area of interest or in response to selecting or identifying an entire image, an image that includes text. The text in the image is identified, segmented, recognized and translated. These steps are performed without delay in sequence as a single set of functions performed together. No selection of an area is needed. The result of recognition is fed directly to the processes that enable translation. Thus, with minimal input, a translation is generated and shown to a user. The disclosed invention is useful in everyday life for example for tourists, who can easily and quickly receive a translation of newspapers, titles, menus, recipes, etc.

Figure 6:
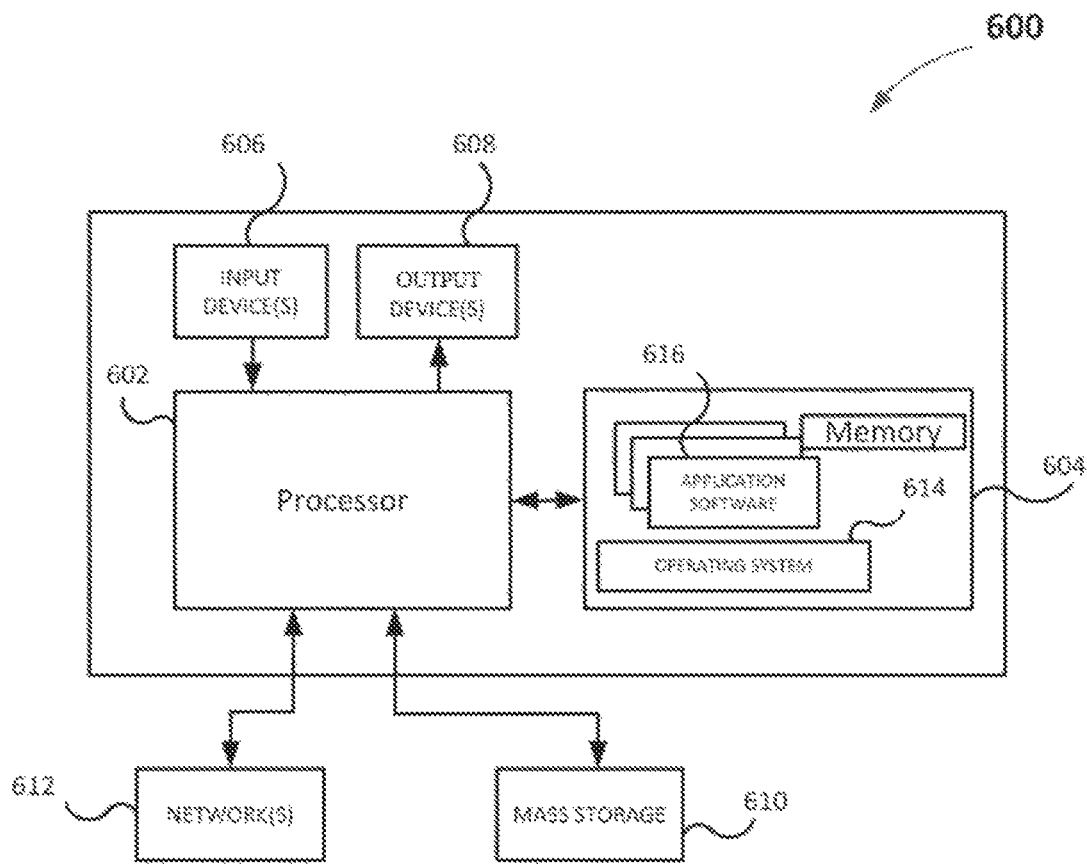
FIG. 6 shows an exemplary hardware for implementing a method on an electronic device, in accordance with an embodiment of the present disclosure.

FIG. 6 of the drawings shows hardware 600 that may be used to implement the user electronic device 102 in accordance with one embodiment of the invention. Referring to FIG. 6, the hardware 600 typically includes at least one processor 602 coupled to a memory 604 and having touch screen among output devices 608 which in this case is serves also as an input device 606. The processor 602 may be any commercially available CPU. The processor 602 may represent one or more processors (e.g. microprocessors), and the memory 604 may represent random access memory (RAM) devices comprising a main storage of the hardware 600, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 usually includes one or more user input devices 606 (e.g., a keyboard, a mouse, imaging device, scanner, etc.) and a one or more output devices 608 (e.g., a Liquid Crystal Display (LCD) panel, a sound playback device (speaker). To embody the present invention, the hardware 600 must include at least one touch screen device (for example, a touch screen), an interactive whiteboard or any other device which allows the user to interact with a computer by touching areas on the screen. The keyboard is not obligatory in case of embodiment of the present invention.

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications 616, components, programs, objects, modules, etc. to implement the techniques described above. In particular, the computer software applications will include the client dictionary application and also other installed applications for displaying text and/or text image content such a word processor, dedicated e-book reader etc. in the case of the client user device 102. Moreover, various applications, components, programs, objects, etc., collectively indicated by reference 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A method for translating text in an electronic image, the method comprising:
    acquiring, by an electronic device, access to the electronic image;
    receiving, by the electronic device, user input providing an indication of an area of interest in the electronic image;
    recognizing characters in the received area of interest and characters an extended area beyond the area of interest;
    determining a subject domain associated with the recognized characters in the area of interest based at least in part on the recognized characters in the extended area;
    translating the recognized characters in the identified area of interest from a source language into a target language at least in part based on the determined subject domain; and
    displaying the translated characters in the target language on a display of the electronic device.

2. The method of claim 1, wherein the recognized characters in the area of interest represent a word, word combination, text or hieroglyph.

3. The method of claim 1, comprising:
    after recognizing characters in the area of interest, displaying the recognized characters on the display of the electronic device; and
    before translating the recognized characters into the target language, receiving an indication of translating the recognized characters.

4. The method of claim 1, further comprising translating a sentence or a paragraph overlapping with the area of interest.

5. The method of claim 1, further comprising translating all text in the electronic image.

6. The method of claim 1, further comprising acquiring the electronic image through a camera of the electronic device.

7. The method of claim 6, wherein acquiring access to the electronic image by the electronic device is through an interaction with a control of the camera of the electronic device.

8. The method of claim 1, further comprising:
    after acquiring access to the electronic image, displaying at least a portion of the electronic image on the display of the electronic device, wherein receiving the indication of the area of interest includes receiving the indication through the displayed electronic image.

9. The method of claim 1, further comprising:
    after recognizing the characters in the electronic image and prior to translating the recognized characters, displaying a result of optical character recognition on the display of the electronic device; and
    prior to translating the recognized characters, receiving an indication corresponding to a correction to one or more of the recognized characters.

10. The method of claim 9, further comprising:
    after receiving the indication corresponding to the correction to one or more of the recognized characters, making the correction to the one or more of the recognized characters, and displaying the corrected recognized characters.

11. The method of claim 9, wherein the correction of the recognized characters-is done by automatic insertion of a correct variant in the recognized characters by the electronic device, or by manual input of the correct variant from a keyboard.

12. The method of claim 1, wherein the extended area comprises a sentence, a paragraph, or a section of a document overlapping with the area of interest.

13. The method of claim 1, wherein the subject domain is further based on a history of translations or a history of corrections of translation of other images accessed by the electronic device.

14. The method of claim 1, wherein the subject domain for translation is further based on data content resident on the electronic device.

15. The method of claim 1, wherein the subject domain for translation is further based on geolocation data.

16. The method of claim 1, further comprising determining a language for recognizing the characters in the electronic image based on geolocation data.

17. The method of claim 16, wherein the determination of the language for recognizing the characters further comprises:
    establishing coordinates of location of the electronic device by a navigation module;
    searching and acquiring from a database a country or region based on the coordinates of location;
    searching and determining from the database a list of one or more languages that are used in the country or region; and
    making the list of one or more languages available for use in recognizing the characters in the electronic image.

18. The method of claim 1, wherein the source language is determined based on geolocation data.

19. The method of claim 1, wherein translating the recognized characters is performed by dictionary translation, or machine translation, or a human-rendered translation.

20. The method of claim 1, further comprising:
    after displaying the translated characters, correcting a portion of the translated characters in response to detecting an indication of a change for at least one character from the portion of the translated characters.

21. The method of claim 1, wherein the extended area is selected by a user of the electronic device.

22. The method of claim 1, wherein the extended area is a picture in the electronic image and the determining of the subject domain is at least in part based on said picture.

23. The method of claim 1, wherein the displaying the translated characters in the target language on the display of the electronic device further comprises replacing the recognized characters with the translated characters and preserving a background of the area of interest.

24. An electronic device comprising:
    a display;
    a processor;

a memory in electronic communication with the processor, the memory configured with instructions for performing a method by the processor, the method comprising:

receiving, by the electronic device, user input providing an indication of an area of interest in an electronic image;

recognizing characters in the received area of interest and characters an extended area beyond the area of interest;

determining a subject domain associated with the recognized characters in the area of interest based at least in part on the recognized characters in the extended area;

translating the recognized characters in the identified area of interest from a source language into a target language at least in part based on the determined subject domain; and displaying the translated characters in the target language on the display of the electronic device.

25. The electronic device of claim 24, wherein the method further comprises:

after recognizing characters in the area of interest, displaying the recognized characters on the display of the electronic device; and before translating the recognized characters into the target language, receiving an indication of translating the recognized characters.

26. The electronic device of claim 24, wherein the method further comprising translating a sentence or a paragraph overlapping with the area of interest.

27. The electronic device of claim 26, wherein the method further comprising translating all text in the electronic image.

28. The electronic device of claim 24, wherein the electronic device further includes a camera, and wherein the method further comprises capturing the electronic image through the camera.

29. The electronic device of claim 24, wherein the method further comprises:

before receiving by the electronic device the indication of the area of interest in the electronic image, displaying at least a portion of the electronic image on the display, wherein receiving the indication of the area of interest includes receiving the indication through the displayed image.

30. The electronic device of claim 24, wherein the method further comprises:

after recognizing the characters in the electronic image and prior to translating the recognized characters, displaying a result of optical character recognition on the display of electronic device; and prior to translating the recognized characters, displaying an indication of a possible error associated with one of the recognized characters, and receiving by the electronic device an indication corresponding to a correction to the recognized character of the possible error.

31. The electronic device of claim 30, wherein displaying the indication of the possible error includes displaying one or more variants of recognition to correct the possible error, and wherein the method further comprises, in response to receiving the indication corresponding to the correction, insertion of a correct variant in the recognized characters corresponding to the indication.

32. The electronic device of claim 24, wherein the subject domain is further based on a history of translations or a history of corrections of translation of other images accessed by the electronic device.

33. A non-transitory computer-readable medium storing instructions which, when executed by an electronic device, cause the electronic device to:

acquire access to an electronic image;

receive user input providing an indication of an area of interest in the electronic image;

recognize characters in the received area of interest and characters in an extended area beyond the area of interest;

determine a subject domain associated with the recognized characters in the area of interest based at least in part on the recognized characters in the extended area;

translate the recognized characters in the identified area of interest from a source language into a target language based on the determined subject domain; and display the translated characters in the target language.

34. The method of claim 1 further comprising displaying alternative variants of translation of the recognized characters in the recognized area of interest.

35. The electronic device of claim 24 further comprising displaying alternative variants of translation of the recognized characters in the recognized area of interest.

36. The non-transitory computer-readable medium of claim 33 further comprising displaying alternative variants of translation of the recognized characters in the recognized area of interest.

* * * * *